Nov. 6, 1962 A. H. KURTZ 3,062,185
CHICKEN NESTS
Filed Nov. 10, 1958 3 Sheets-Sheet 1

INVENTOR.
AARON H. KURTZ
BY *Price and Heneveld*
ATTORNEYS

Nov. 6, 1962    A. H. KURTZ    3,062,185
CHICKEN NESTS
Filed Nov. 10, 1958    3 Sheets-Sheet 2

INVENTOR.
AARON H. KURTZ
BY *Price and Heneveld*
ATTORNEYS

Nov. 6, 1962    A. H. KURTZ    3,062,185
CHICKEN NESTS

Filed Nov. 10, 1958    3 Sheets-Sheet 3

INVENTOR.
AARON H. KURTZ
BY
Price and Heneveld
ATTORNEYS

United States Patent Office 3,062,185
Patented Nov. 6, 1962

3,062,185
CHICKEN NESTS
Aaron H. Kurtz, New Holland, Pa., assignor to Automatic Poultry Feeder Company, Zeeland, Mich., a corporation of Michigan
Filed Nov. 10, 1958, Ser. No. 772,755
5 Claims. (Cl. 119—48)

This invention relates to chicken nests and a combination chicken coop and nest. More particularly, this invention relates to chicken nests allowing egg gathering from either the front or the back thereof, adapted to have a simple and efficient structure in combination therewith for cleaning the nests.

Many types of chicken nests are old and already known. However, such nests have never been entirely satisfactory. Structures presently in existence are adapted for use only in the environment existing at the time of their purchase. If conditions change, for example, if a new building is constructed, such structures are not readily adaptable for change. Some structures are presently in existence which allow gathering of eggs exteriorly of the nest itself. However, such structures are not adapted to be used for gathering eggs either from the front or the rear of the nest.

Further, no efficient means has been provided which enables one to clean these nests simply and efficiently, either from the front or the rear of the nest housing. Structures presently in existence are not adapted to function equally well in a number of environments. Such adaptable structure is, of course, very useful to those in the poultry industry because conditions and requirements around chicken pens change constantly. Competition in the poultry industry is extremely intense and if one is to remain in business his equipment must be such that it will function equally well in any situation and environment where it is used.

Further, it is becoming increasingly more desirable to avoid entering the area where the chickens are kept when taking care of them. It has been found that production is at its highest when the caretakers do a maximum amount of their work from the outside of the pen. Many newer hen houses under construction are of a type such that aisles are provided for the men to work in and feeders are in existence which enable the men to feed and water the chickens from these aisles. It is also highly desirable to gather the eggs and clean the chicken nests from these aisles. Consequently, the industry has felt a need for an inexpensive and efficient chicken nest adaptable to these conditions.

It is, therefore, an object of this invention to provide a chicken nest which is adapted to adjust so that eggs may be gathered therefrom exteriorly of the nest at either the front or the back thereof.

Another object of this invention is to provide such a nest which is also adjustable to allow efficient cleaning of the nest from either the front or the back.

Another object of this invention is to provide a chicken nest which is adapted to facilitate egg gathering exteriorly of the chicken pen itself.

Another object of this invention is to provide such nests which are simple in construction and easy and inexpensive to maintain.

Another object of this invention is to provide such nests in combination with structure which enables the nest to be closed while the eggs are being gathered.

Still another object of this invention is to provide a chicken enclosure such that one never enters the enclosure to gather eggs.

Another object of this invention is to provide such an enclosure which is simple in construction and especially adapted for warm weather use.

Other objects and purposes of this invention will become obvious to those skilled in the art of poultry equipment upon reading the following specification in conjunction with the accompanying drawings.

Figures 1, 2:
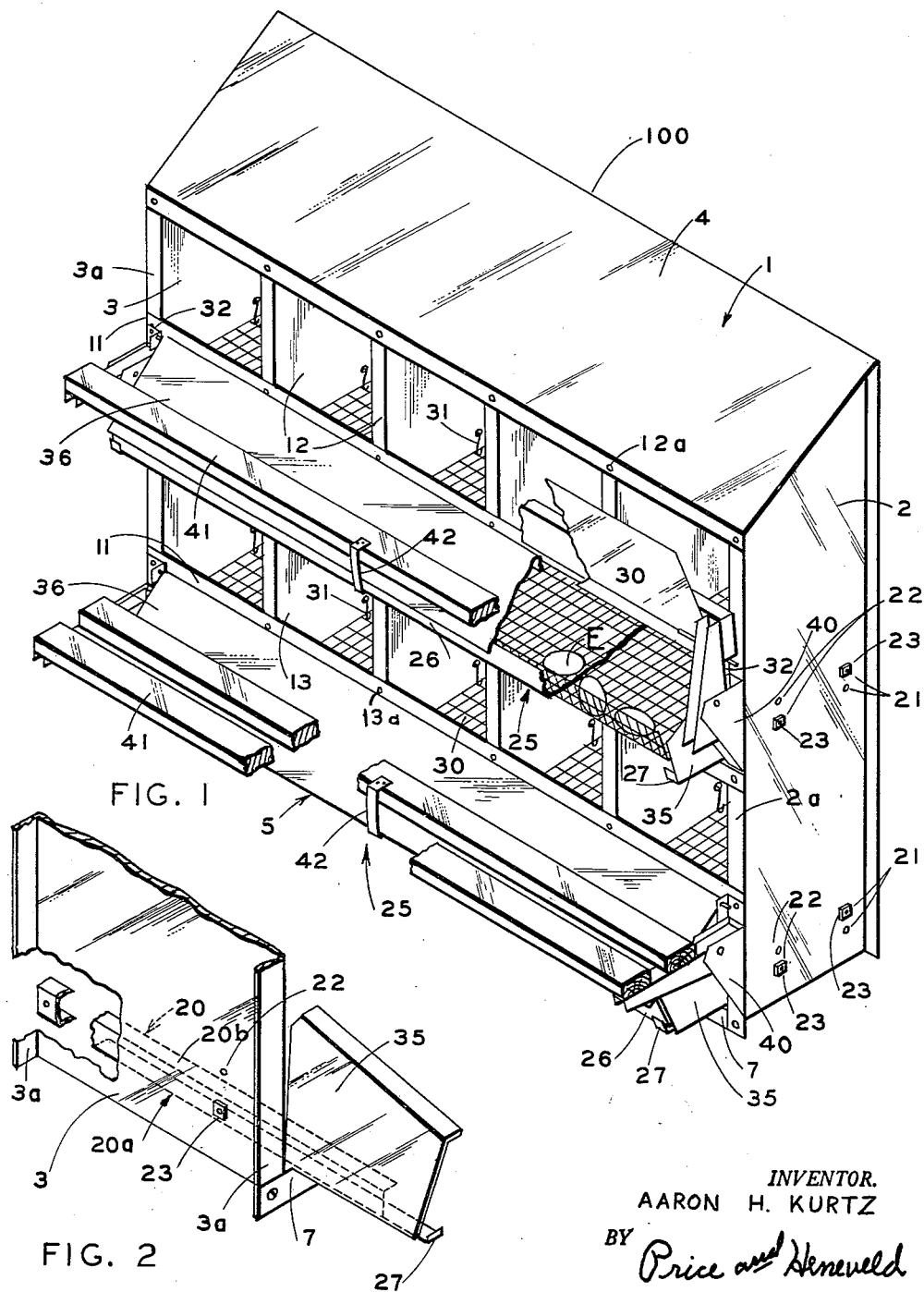
FIG. 1 is a front, perspective view of a chicken nest comprising one aspect of this invention, certain parts thereof being broken away to better show the invention.
FIG. 2 is a fragmentary, perspective, side view showing the manner in which the exterior egg gathering and cleaning means is adjustably mounted within the housing, certain parts being broken away to better show the invention.

Briefly, one aspect of this invention relates to a chicken nest comprising a housing and spaced dividers positioned in a plane generally parallel to the sides of the housing, forming individual compartments, the compartments being open at the front of the housing to admit a chicken. A tray is positioned under these compartments and runners are removably mounted on the sides of the housing for supporting the tray. The runners are adapted to be mounted within the housing in a plurality of positions, including positions of decline toward both the rear and the front of the housing. The runners protrude from the housing in the direction of the declivity of the runners. The tray is of such size that it extends from the housing in the direction of declivity, whereby eggs in the compartments roll on the tray to the exterior of the housing for gathering. The tray is slidable in the runners whereby the tray can be easily removed for cleaning.

Another aspect with this invention relates to a chicken coop comprising walls with the egg gathering compartment mounted in cut-out portions of the walls. The nests communicate with the egg gathering compartment so that the eggs roll from the nests to the outside of the coop.

Referring specifically to the drawings, reference numerals 100 and 200 (FIGS. 1 and 3) designate front and back gathering chicken nest assemblies, respectively, which nests are both constructed of the same parts and components including the housing 1. The housing 1 in each embodiment includes sides 2 and 3, top 4, front 5 and back 6. In the preferred construction of this invention, the sides 2 and 3 of housing 1 have flanges 2a and 3a, respectively, along their front and back edges to facilitate fabrication. The top 4 of housing 1 is mounted on the side plates by any suitable means such as bolting or spot welding and is preferably sloped downwardly toward the front of the nest, as shown, to prevent the birds from standing thereon. The rigid bracing members 7 and 8 secured between the two sides of the housing 1 at their bottom provide a rigid structure.

A plurality of spaced dividers 12 and 13 are positioned within the housing 1 in a plane generally parallel to the sides of the housing, forming indivdual nesting compartments. The dividers 12 are secured by suitable means, such as bolts 12a, to the top 4, top panel 10 and top brace 11. The dividers 13 are secured by suitable means, such as bolts 13a, to the bottom panel 10 and the bottom bracing member 11 at the front of the housing 1. It will be noted that spaces are left through the width of the housing below the top dividers 12 and below the bottom dividers 13. It is in these spaces that the reversible egg gathering and nest cleaning means are mounted within the housing. On each side 2 and 3 of the housing 1 of nest assembly 100, two pairs of openings or holes 21 and 22 are positioned facilitating the arrangement of the egg gathering and nest cleaning means in the front or back.

FIG. 1 shows this egg gathering and nest cleaning means mounted in a manner facilitating the gathering of eggs and the cleaning of the compartments exteriorly of the housing at the front thereof. FIG. 2 shows a detailed view of this mounting means. In the preferred embodiment of this aspect of the invention, generally U-shaped channels 20 are mounted one on each of the sides 2 and 3 of the housing 1 for each tier of nesting compartments. Two pairs of holes 21 and 22 are provided for each runner in the sides 2 and 3 of the housing 1. By means of bolts 23 the channel runners 20 may be mounted in a plurality of positions, including positions of decline toward both the rear and the front of the housing 1. This is accomplished by a proper selection of holes from the pair of holes 21 near the back of the housing and the pair of holes 22 near the front thereof. Mounted on a pair of channels 20 is the clean out tray 25 and floor screen 30. The tray 25 has upturned edges 26 along its front and back edges. It will be noted that tray 25 is adapted to be slid in and out of the housing 1 within the runners 20 and below the floor screen 30. The channel runners 20 are of such lengths that a portion thereof extend exteriorly of the housing for providing an exterior egg gathering and nest cleaning means. The bottom flange 20a of the channel runners 20 extends beyond the main body of the channel runner and is slightly upturned at 27 to normally prevent the tray 25 from sliding out of the channel runners 20 because of their inclination.

The floor screen 30 has generally the same shape as the tray 25 and is secured to and rests upon the top flange 20b of the channel runners 20. Thus, screen 30 is supported just above the tray 25. A hook 31 mounted on each of the dividers 12 and 13 helps to support and suspend the screens throughout their width. It will be noted that the screen 30 will have the same inclination as the runners 20 and the tray 25. It will now be obvious that eggs laid in the individual compartment on the screen within the housing will roll in whichever direction the runners 20 are declined. Eggs E are shown in FIG. 1, having rolled exteriorly of the housing on the screen 30 to the front of the housing because the direction of declivity is toward the front of the housing 1.

Side plates 35, enclosing the sides of the egg gathering compartment, are secured by suitable means, such as spot welding, to that portion of the runners 20 which extend exteriorly of the housing 1. A cover 36 encloses the top of the egg gathering compartment by being pivotally secured to the tab 32 above the top of side plates 35 and extending down to the upturned edge 26 of the tray 25. It will be noted that the side plates 35, the upturned edge 26 of tray 25 and the cover 36 form a protective enclosure for the eggs E which roll etxeriorly of the individual compartments in housing 1. Thus, these eggs cannot be pecked or damaged by the birds themselves after they are laid and roll exteriorly of the housing.

Hinges 40 are secured adjacent each side plate 35, pivotally supporting a perch 41. It will be understood that the perch is only necessary at the front of the housing 1 to be used as a stepping stone for the birds to enter the individual nesting compartments. When the channel runners 20 are mounted in a manner as shown in FIG. 1 to facilitate gathering of the egg in front of the nest, the perch 41 is used in conjunction with the egg gathering. A hook 42 connects the perch 41 and the cover 36, such that pivoting of the perch upwardly also raises the cover and exposes the screen 30 for gathering of the eggs. Thus, when one wishes to gather the eggs, he raises the perch 41 such that it covers an entire row of individual compartments, preventing chickens from flying off the nest while the eggs are being gathered.

The back of nest assembly 100 is covered by sheet metal panels (not shown) so as to confine the birds inside the nests when the perch 41 is up.

Figure 3:
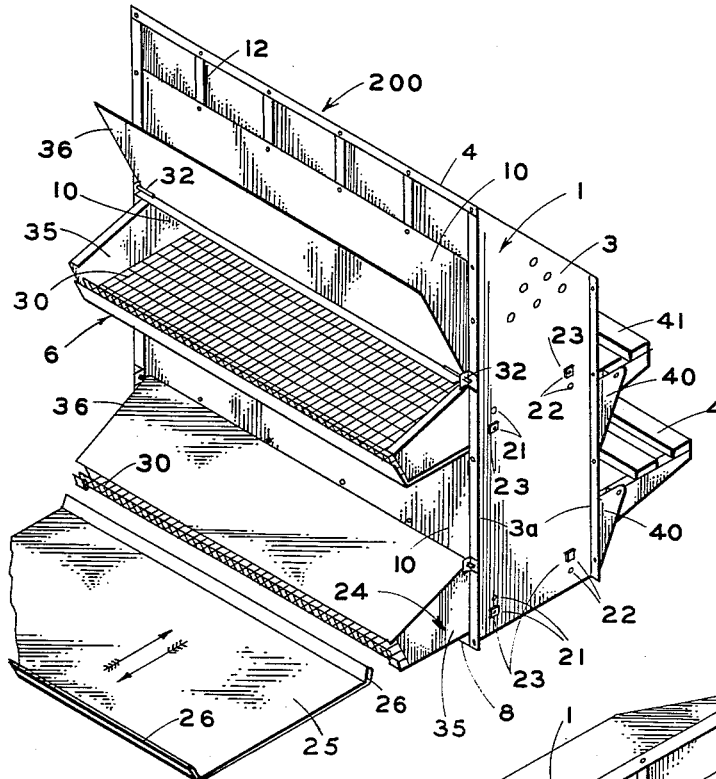
FIG. 3 is a perspective, rear view of a nest comprising another aspect of this invention in which the exterior egg gathering and cleaning structure is mounted at the back of the housing.

Structure as shown in FIGS. 1, 2 and 3 is adapted to serve equally well whether one wishes to gather eggs and clean the nest at the front or the rear of the housing 1. One simply selects the proper holes 21 or 22 for mounting the channel runners 20 such that it has the proper declivity.

In the embodiment of FIG. 3 the channel runners 20 extend from the back of the housing and are inclined to the back by securing the runners 20 to the sides 2 and 3 by bolts 23 extending through the upper one of the openings 22 and the lower one of the openings 23. This is just opposite to the arrangement of nest assembly 100 forming the egg collecting compartment 24 at the back. Otherwise, the structure is substantially identical. One difference is the panels 10 covering the back openings to the laying compartments. These panels extend from substantially above the cover 36 downwardly below it a sufficient distance (not shown) to prevent the chickens from reaching with their necks into the egg gathering compartment but permitting the eggs to roll under.

Figure 4:
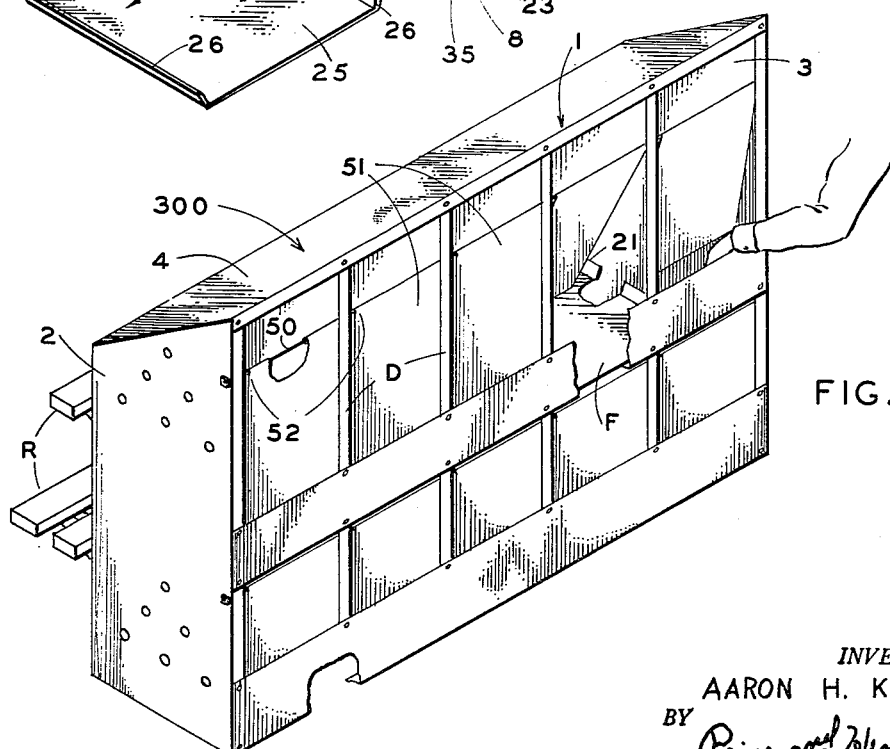
FIG. 4 is a perspective, rear view of a chicken nest comprising another aspect of this invention.
Figure 5:
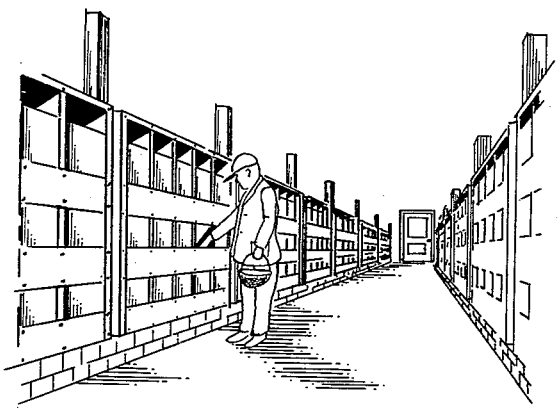
FIG. 5 shows a plurality of chicken nests, shown in FIG. 4, arranged for gathering eggs from the aisle.
Figure 7:
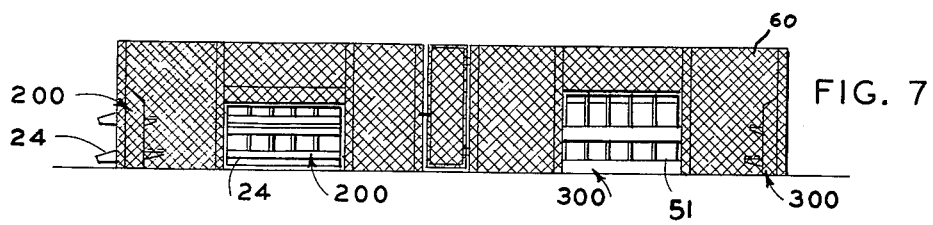
FIG. 7 is a side view of the chicken coop and nest combination shown in FIG. 6.
Figure 8:
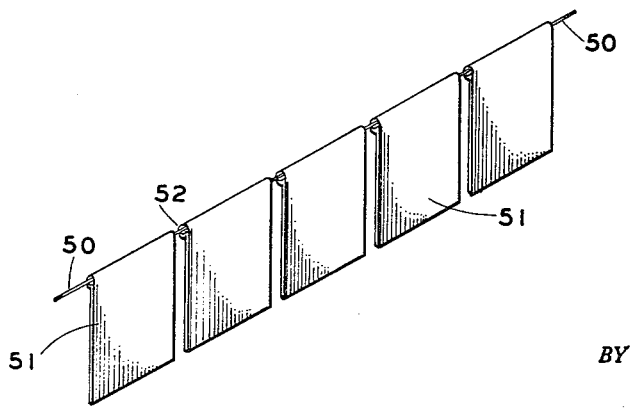
FIG. 8 shows in detail the gate structure shown in FIGS. 4 and 5 enabling eggs to be taken from the chicken nest housing.

Another aspect of this invention is shown in FIGS. 4, 5 and 8. This chicken nest is adapted to be utilized for gathering eggs from an aisle of a chicken house as shown in FIG. 5 or from the outside of a chicken enclosure as shown in FIG. 7. The structure of the chicken nest assembly 300 shown in FIG. 4 is basically the same as that described hereinbefore. A housing 1 includes sides 2 and 3, a top 4, a front 5 and a back 6. The dividers D divide the housing into a plurality of individual nesting compartments. A floor F is mounted such that a bottom is provided for each of the individual compartments. It should be understood that any number of rows or tiers of individual compartments may be utilized, depending upon the particular needs of the individual user. Each individual compartment is, of course, accessible from the front, the chickens moving on the roosts R into these compartments. Mounted at the back of each row of individual compartments is a rod 50. Rod 50 slidably receives a plurality of gates 51, each gate 51 having one of its edges curled at 52 (FIG. 8). Each one of these gates 51 is thus adapted to pivot about the rod 50. The gates are positioned to enclose the back portion of each of the individual compartments within the housing 1. The gates 51 are such length that they will not pass exteriorly of the housing 1, thus, may only be pivoted inwardly. Such structure allows one to pivot the gate inwardly and collect the eggs from the nest from the outside of the chicken enclosure. One does not have to enter the enclosure. The examination of FIGS. 4 and 5 shows an example of how the chicken nests comprising this aspect of this invention may be utilized. One merely walks down the aisle, pushes the gates 51 inwardly and removes the eggs from within each of the compartments.

Figure 6:
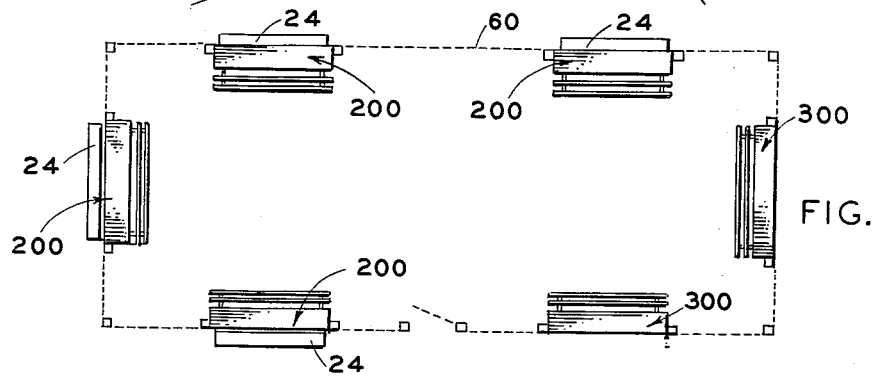
FIG. 6 is a plan view of a chicken coop and nest combination comprising another aspect of this invention.

Still another aspect of this invention is shown in FIGS. 6 and 7. Chicken nests similar to those disclosed hereinbefore are utilized in the fabrication of this chicken coop. A wall comprising wire mesh fence 60, or any other material, is provided of such height that the chickens cannot escape. Preferably, a roof is also provided to complete the coop. Extending through the cut-out portions of wall or fence 60 are the egg collecting compartments 24 of the type described with relation to FIG. 3. Thus, by being able to gather eggs from the rear of these nests, one need never enter the chicken enclosure itself to gather them. Structure of this type has been found to be extremely useful, especially in areas where the temperature remains quite warm during most of the year. However, it must be understood that other material may be used for the construction of the walls so long as it is adapted to have portions thereof cut-out for insertion of chicken nests of the type described herein. A chicken enclosure of this type greatly enhances productivity because the eggs can be gathered without ever entering the enclosure.

*Assembly and Operation*

The chicken nest comprising one aspect of this invention is assembled as follows. The housing 1 is fabricated by suitably joining sides 2 and 3, top 4, front and back braces 7 and 8, back panels 10 and bracing members 11 (FIGS. 1 and 3). The dividers 12 and 13 (the number of such dividers depending upon the number of tiers and the number of individual compartments desired) are mounted within the housing as described hereinbefore. The U-shaped channel runners 20 are then secured to the sides 2 and 3 of the housing 1. The bolts 23 are placed through selected holes in the pairs of holes 21 and 22 in the sides of the housing. The selection of holes determines the slope of the runners. Thus, these runners may be mounted within the housing such that they will slope either toward the front of the housing (FIG. 1) or toward the rear of the housing (FIG. 3). This in turn will determine whether one will gather the eggs from the front 5 of the housing or from the rear 6 thereof. When bolts 23 have secured U-shaped channel runners 20 to the sides 2 and 3 of the housing 1, the tray 25 is slid between the flanges 20a and 20b of the runners 20 such that one of the upturned ends 26 extends exteriorly of the housing 1. The floor screen 30 is mounted on the top flange 20b of the runners 20 and supported throughout its width by means of hooks 31 fastened to the spaced dividers 12 and 13. Side plates 35 are secured to the portions of the runners 20 extending exteriorly of the housing 1. Cover 36 is pivotally secured to the bracing member 11 lying immediately above the side plates 35. Hinges 40 are secured to the front flanges of the side plates 2 and 3 adjacent the side plates 35. A perch 41 is then pivotally secured within the hinges 40 adapted to rest upon side plates 35. A hook 42 connects perch 41 and cover 36.

The embodiment of this invention shown in FIGS. 4 and 5 has a housing 1 assembled in generally the same manner as described hereinbefore. The major difference is the mounting of the structure shown in FIG. 8 within the housing 1. A rod 50 extends through the sides 2 and 3 and the dividers D at the back of the housing 1. Gates 51 are positioned at the rear of the housing such that they will pivot into each compartment formed by the dividers D. This is accomplished by depending the gates 51 from the rod 50 by means of its curled edge 52. The gates 51 are of such length that they cannot pivot exteriorly of the housing 1. A gate is provided for the rear of each separate compartment. Thus, it will be noted upon examination of FIG. 5 that such nests are especially adapted to facilitate the gathering of eggs from the aisle of a chicken house.

The chicken enclosure of FIGS. 6 and 7 is assembled as follows. Fence 60 is supported to form walls of a chicken enclosure such that the birds cannot escape therefrom. Nest assemblies 200 are then arranged so that their egg gathering compartments 24 extend into cut-out portions in these walls. Thus, the chickens are completely enclosed and are able to enter the individual compartments of the housing 1. All eggs can thus be gathered from this enclosure without ever entering it.

As shown by the two nest assemblies 300 at the right end, these assemblies can be mounted in an opening in the wall so that the eggs can be gathered from the exterior in the manner described in relation to FIG. 5.

The operation of this new and improved chicken nest, shown in FIGS. 1, 2 and 3 is as follows. The assembling of the structure as described hereinbefore will determine whether one gathers the eggs from the front or the rear of the nest. If the user has chosen to gather the eggs from the front of the housing, he merely grasps the perch 41, raising it upwardly to completely close the corresponding row of nests, at the same time lifting the cover 36 which enables him to gather the eggs which have rolled exteriorly from each compartment of the housing. If one is gathering eggs from the rear, then he need only lift the cover 36 to gather the eggs. All litter collecting in each of the individual compartments will, of course, fall through screen member 30 onto the tray 25. When the user desires to clean the tray, he can do so by merely withdrawing the tray as shown in FIG. 3, removing the litter and then sliding the tray back into the housing by means of the runners 20. It will be noted that the user can assemble his structure such that he may clean the nests from either the front or the rear.

The embodiment of this invention shown in FIGS. 4 and 5 operates as follows. Once the checken nests are positioned, such that the back end thereof faces an aisle in the checken house, one need merely walk down this aisle, push the gates 51 inwardly and collect the eggs from the nest. He does not have to enter that portion of the chicken house where the chickens are kept.

The operation of the chicken enclosures shown in FIGS. 6 and 7 should be obvious. If the type of chicken nests shown in FIGS. 4 and 5 are utilized, one merely pushes the gates 51 inwardly to collect the eggs from the nest. If one uses the embodiment of this invention shown in FIGS. 1, 2 and 3, he merely lifts cover 36 to collect the eggs exteriorly of the housing 1. In either case, the user never need enter the chicken enclosure to collect the eggs.

The structure described herein has disclosed a chicken nest which is equally well adapted to have eggs gathered from either the front or the back thereof. Such poultry equipment is easily adaptable to any environment in which it is placed. This chicken nest also includes structure which enables one to easily and quickly remove the litter therefrom, such removal being carried out at either the front or the rear of the nest. The structure is simple in construction and inexpensive to assemble and maintain. FIGS. 4 and 5 show a chicken nest which is especially adapted to facilitate the gathering of eggs from without the enclosure where the chickens are kept. The chicken enclosure of FIGS. 6 and 7 shows structure which enables one to remove all the eggs without ever entering the enclosure itself.

It must be understood that various other embodiments may be utilized to practice this invention. Such other embodiments are considered to be within the spirit and scope of this application unless the appended claims specifically state otherwise.

I claim:

1. A chicken nest assembly, comprising: a housing; spaced dividers positioned in a plane generally parallel to the sides of said housing forming individual compartments for receiving chickens at the front thereof; a plurality of gates pivotally mounted, each along its top edge, one at the rear of each of said compartments; and means for limiting said pivotal movement into said compartments only, whereby eggs may be gathered from said compartments at the rear of said housing.

2. A chicken nest assembly as defined in claim 1, said assembly mounted in a wall of a chicken enclosure, said front of said housing exposed on one side of said wall and said rear of said housing exposed on the other side of said wall.

3. A chicken nest assembly, comprising: a housing; spaced dividers positioned in a plane generally parallel to the sides of said housing forming individual compartments for receiving chickens at the front thereof; an elongated rod mounted along the rear of said housing lying generally at the tops of said compartments; a plurality of gates pivotally mounted on said elongated rod, one at the rear of each of said compartments; and means for limiting said pivotal movement into said compartments only, whereby eggs may be gathered from said compartments at the rear of said housing.

4. A chicken nest assembly as defined in claim 3, said gates comprising thin plates having one end curled to pivotally depend from said rod.

5. A chicken nest assembly as defined in claim 3, said assembly mounted in a wall of a chicken enclosure, said front of said housing exposed on one side of said wall and said rear of said housing exposed on the other side of said wall.

References Cited in the file of this patent

UNITED STATES PATENTS

| | | |
|---|---|---|
| 1,674,193 | Coltrin | June 19, 1928 |
| 1,824,557 | Loehr | Sept. 22, 1931 |
| 2,011,539 | Jucker | Aug. 13, 1935 |
| 2,692,578 | Manning | Oct. 26, 1954 |
| 2,694,381 | Kaegebein | Nov. 16, 1954 |
| 2,728,324 | Radocy | Dec. 27, 1955 |
| 2,737,926 | Maness | Mar. 13, 1956 |